(12) United States Patent
Sanchez (10) Patent No.: US 7,438,820 B1
(45) Date of Patent: Oct. 21, 2008

(54) WASTE WATER FILTERING METHOD AND SYSTEM

(76) Inventor: Robert M. Sanchez, 1470 No. Brighton St., La Habra, CA (US) 90631

( * ) Notice: Subject to any disclaimer, the term of this patent is extended or adjusted under 35 U.S.C. 154(b) by 0 days.

(21) Appl. No.: 11/829,830

(22) Filed: Jul. 27, 2007

(51) Int. Cl.
*B01D 37/00* (2006.01)
*B01D 35/00* (2006.01)

(52) U.S. Cl. ......................................... 210/767; 210/95
(58) Field of Classification Search .................. 210/95, 210/767
See application file for complete search history.

(56) References Cited

U.S. PATENT DOCUMENTS

| | | |
|---|---|---|
| 4,795,556 A | 1/1989 | Brotea et al. |
| 5,662,791 A | 9/1997 | Hurst et al. |
| 6,173,739 B1 * | 1/2001 | Addo et al. ............... 137/512.1 |

2007/0039978 A1  2/2007  Scheugenpflug

\* cited by examiner

*Primary Examiner*—Chester T. Barry
(74) *Attorney, Agent, or Firm*—Kenneth L. Green; Edgar W. Averill, Jr.

(57) ABSTRACT

A waste water filtration system filters polluted waste water from various waste water sources including fire sprinkler systems and fire hydrants. The system includes a sight tube which connects to a female swivel connection on, for example, a Fire Department Connection (FDC). A flexible hose connects the sight tube to a mobile filtering system. The sight tube allows the observation of a waste water flow from the waste water source to ensure that a complete flushing has been accomplished. The filtering system includes a stainer to capture large particles, a filter to capture small particles, and a chemically selective sponge to capture, for example, oil, and destroy bacteria. The filtering system allows compliance with NFPA Standards, California State Fire Marshal's "Title 19 Regulations for maintaining fire sprinkler systems, and Federal Clean Water laws, Federal Coastal Zone laws, and local city ordinances for releasing liquids into storm drains.

14 Claims, 7 Drawing Sheets

WASTE WATER FILTERING METHOD AND SYSTEM

BACKGROUND OF THE INVENTION

The present invention relates to containment of stagnant, polluted, and/or contaminated liquids and in particular to containment, filtration, and discharge of the stagnant, polluted, and/or contaminated water released from sprinkler systems during periodic testing.

Although the water entering a sprinkler system is generally potable water, there are subsequent effects which may drastically reduce the quality of the water in such systems. This water often remains in the sprinkler system for one or more years becoming contaminated, stagnant, and stale, having a very foul odor. Black iron pipe is generally used since it is more economical than potable piping, but unfortunately black iron pipe is prone to rusting which contaminates water residing in the black iron pipe. Also, new black iron pipe has an oil coating to protect it from rusting between manufacture and installation. This oil coating also contaminates the water.

In addition to the effects of using black iron pipe, the water residing in fire sprinkler lines in most buildings is contaminated with pollutants including chemicals, toxins, and disease causing agents. Nitrates, poly-phosphates and other corrosive inhibitors, as well as fire suppressants and anti-freeze may be added to the sprinkler water system as well. Also, between sprinkler system flushes, the water residing in the pipes may accumulate iron, magnesium, lead, copper, nickel, and zinc. This water generally becomes toxic and contains living and dead bacteria and breakdown products from chlorination. This may result in a significant Biochemical Oxygen Demand (BOD) problem. The BOD is a measure of the amount of oxygen required for the biochemical degradation of organic material in a water sample.

Such sprinkler systems are common in both residential and commercial building. Because of the obvious safety issues with reliance on a sprinkler system, periodic testing of sprinkler systems is required by the National Fire Protection Association (NFPA) standards (NFPA13). Such tests generally include draining and flushing stagnant, polluted, and/or contaminated water from the sprinkler systems and generally results in the stagnant, polluted, and/or contaminated water run off into the storm drains. The sprinkler tests include a Quarterly Fire Sprinkler Test, a Quarterly Drain Test, a Yearly Flow Test, a 5-Year Fire Sprinkler Certification Test, and a Flush Test for all new fire sprinkler system installations.

The Quarterly Fire Sprinkler Test includes placing an intentionally broken sprinkler head at the end of a sprinkler pipe to simulate an actual fire sprinkler activation. Fire sprinklers are designed to include an inspector's test valve attached with one inch piping leading to the outside of the building. Once the inspector's test valve is opened, it detects the broken sprinkler head and simulates an actual fire sprinkler activation. The inspector attempts to confirm that the local bell for the building goes off and also that a monitoring company has received a signal indicating that the sprinkler system has been activated. Stagnant, polluted, and/or contaminated water is released during this test and generally runs off into storm drains leading to streams, lakes and beaches.

The Quarterly Drain Test is required by the NFPA and insurance companies and requires opening a drain valve at a sprinkler riser for a few seconds and then closing the drain valve quickly to see how quickly a pressure gauge returns to normal pressure. The Quarterly Drain Test assures that a main valve out in the street is open and has not been accidentally closed by a public works employee. Again, the stagnant, polluted, and/or contaminated water released during this test generally runs off into the storm drains leading to streams, lakes and beaches.

The Yearly Flow Test is required by the NFPA on public and on-site fire hydrants (hydrants on private properties). The hydrant's valve is exercised and flowed. A diffuser is connected to a 2½ inch outlet on the fire hydrant and a pilot tube is used to measure the flow in Gallons Per Minute (GPM) and residual pressure when the valve is fully open. Again, stagnant, polluted, and/or contaminated water is released during this test and generally runs off into the storm drains leading to streams, lakes and beaches.

The Five Year Sprinkler Certification Test is perhaps the most important of all the fire sprinkler tests because without this certification, occupancy of the building cannot be granted. A portion of the Five Year Sprinkler Test requires that a backflush test be performed. The backflush test requires that a check valve located by the Fire Department Connection (FDC) be reversed or blocked in the open position in order to perform the test. This procedure requires one to shut-off the main control valve and to remove (generally unbolt), reverse the check valve, the control valve is then opened allowing water to run freely out to the FDC outlets which is an FDC inlet during normal operation. Such backflush insures that the FDC is free and clear of any obstructions, debris or foreign objects. If an FDC is clogged by such debris, or even merely contains such debris, the debris may enter the sprinkler system and may cause damage to the fire sprinkler system and/or make the system inoperable or less effective. The FDC is normally located by the sidewalk a few feet from the storm drains. The Five Year Sprinkler Certification Test is usually witnessed by the Fire Department to confirm that the FDC is clear. When this test is performed, the stagnant, polluted, and/or contaminated water released during the test generally runs off into the storm drains leading to streams, lakes and beaches.

Another NFPA requirement is that all new fire sprinkler system installations must have a Flush Test performed. The fire sprinkler system receives water from a Water Department's main potable water system (or main) generally running under a street in front of the building containing the system. An underground utilities company is usually contracted to perform a Hot Tap into the main. This requires specialized equipment to cut into the main while it is still containing water under pressure and install a control valve. The underground contractor then runs underground piping to the property line. The fire sprinkler contractor takes over at the property line and continues the underground piping, installing a backflow preventor, an FDC, and a control valve. Prior to connecting into the sprinkler's riser, the Flush Test of the underground piping is required. This test is witnessed by the Fire Department. Often, the water in the underground piping is black, contains oil, metal shavings, debris, etc. This stagnant, polluted, and/or contaminated water generally is released into the storm drains leading to streams, lakes and beaches.

In addition to periodic testing, in the course of a tenant improvement project, the standard procedure for a Fire Sprinkler Contractor is to drain the sprinkler system. However, some trapped water remains in the lines and is later emptied into, for example, a 55 gallon drum with wheels. A serviceman dumps the water, which often includes stagnant, polluted, and/or contaminated water, to the curb which leads to the storm drains leading to streams, lakes and beaches.

The release of contaminated water into storm drains not only causes sickness, but sometimes even deaths in humans, animals and aquatic life. This water pollution problem, along with other industrial wastes, has contributed to rendering several recreational areas, streams, lakes and beaches completely contaminated and unsafe.

The "Federal Clean Water Act" requires that the fire sprinkler waste water flushed from a sprinkler system be directed to a sewer leading into a water treatment plant. Under no circumstances should fire sprinkler water containing high levels of pollutants be allowed to enter the storm drains. The illegal practice of allowing contaminated fire sprinkler water to enter the storm drains has been ongoing for decades, perhaps since fire sprinklers were first introduced to the public, in spite of stiff fines and penalties from the Water Districts. Because of the present difficulty in satisfying the Federal Clean Water Act, sprinkler system tests are still conducted which allow the polluted water to enter storm drains.

Although some municipalities have started requiring containment of this flushed polluted water when performing these tests, known apparatus and methods have failed. Some have suggested running hoses connected to the FDC directly to a sewer line. Unfortunately, the sewer lines are often blocks away from the FDC and this procedure would require traffic control since the sewer plates are located in the middle of the streets. Also, the fire inspectors would have to be present at the street sewer plate to witness the clear water indicating that the FDC has been flushed and cleared.

Another proposed method is to have a waste management disposal company collect the water and then transfer it to a water treatment plant. But to coordinate with a fire inspector and a waste management disposal company is problematic. Because of the fire department inspector's heavy workload, they are often late for these scheduled tests. The added cost to contract a waste management disposal company, and have them also wait for the inspector, would have to be passed on to the business owner and would be cost prohibitive.

BRIEF SUMMARY OF THE INVENTION

The present invention addresses the above and other needs by providing a waste water filtration system which filters polluted waste water from various waste water sources including fire sprinkler systems and fire hydrants. The system includes a sight tube which connects to a female swivel connection on, for example, a Fire Department Connection (FDC). A flexible hose connects the sight tube to a mobile filtering system. The sight tube allows the observation of a waste water flow from the waste water source to ensure that a complete flushing has been accomplished. The filtering system includes a stainer to capture large particles, a filter to capture small particles, and a chemically selective sponge to capture, for example, oil, and destroy bacteria. The filtering system allows compliance with NFPA Standards, California State Fire Marshal's "Title 19 Regulations for maintaining fire sprinkler systems, and Federal Clean Water laws, Federal Coastal Zone laws, and local city ordinances for releasing liquids into storm drains.

In accordance with one aspect of the invention, there is provided a feasible and cost effective system waste water filtering system including a sight tube for observing the clarity of a waste water flow, a filtering suite connected to the sight tube for receiving the waste water flow from the sight tube, and a drain hose connected to an outlet of the filtering suite for carrying the clean flow to a drain site. The filtering suite sequentially includes first, a strainer for capturing large particles in the waste water flow to create a strained flow, second, a filter for capturing small particles remaining in the strained flow to create a filtered flow, and third, a second sight tube encasing a chemically selective polymer for capturing oils in the filtered flow to create a clean flow. The filtering suite may further include a Reverse Osmosis (RO) filter at the outlet of the chemically selective polymer for capturing nitrates in the clean flow. A rod generally protrudes from the sprinkler system end of the clear sight tube connector fitting and holds a clapper in the FDC open during the backflush test. The rod is preferably a ⅜ inch all thread rod. The clear sight tube allows a fire department inspector to visually observe a waste water flow through the sight tube change from dirty to clean as the flushing of the fire sprinkler system is performed. When sufficient filtering is performed, and proper permission obtained from local authorities, the filtered waste water may be released into storm drains. Different standard fittings would be used for different applications, for example, Quarterly and Drain Tests.

In accordance with yet another aspect of the invention, there is provided a method for waste water filtering. The method includes: connecting a sight tube to a Fire Department Connection (FDC); connecting a first end of a hose to the sight tube; connecting a second end of the hose to a filter system, the filter system sequentially comprising a strainer, a filter, and an encased chemically selective polymer; positioning a filter system drain hose to empty into a storm drain and/or landscaping; releasing a flow of waste water from the FDC through the sight tube and hose to the filter system; observing the flow of waste water through the sight tube; continuing the flow of waste water until a clean flow is observed in the sight tube; and shutting off the flow of waste water from the FDC.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
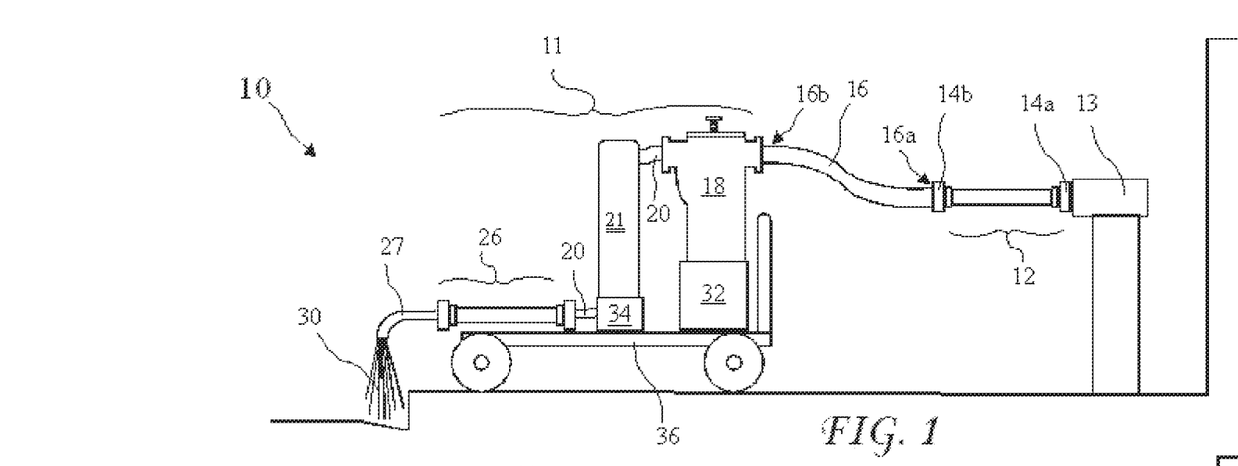
FIG. 1 depicts a waste water filtering system according to the present invention connected to a Fire Department Connection (FDC).

A waste water filtering system according to the present invention is shown connected to a waste water source comprising a Fire Department Connection (FDC) 10 in FIG. 1. The waste water filtering system includes a sight tube 12, a hose 16, and a filtering suite 11. The sight tube 12 is preferably attached between a first female swivel connection 14a attached to the FDC 13 and a second female swivel connection 14b attached to a sight tube end 16a of the hose 16. The hose 16 is connected to a strainer 18 by a third female swivel fitting 14c at a strainer end 16b of the hose 16. The hose 16 is preferably a two inch diameter non-kink hose and is preferably clear. A suitable material is Polyvinylchloride (PVC) and an example of a suitable hose is Master-Flex® 101CL hose made by Gates Corporation in Denver, Colo. The waste water filtering system 10 may also be applied to filtering waste water released from sources other than the FDC 13, and in those instances a sight tube with an appropriate connection may be used, or an adapter between the sight tube 12 and the waste water source may be used. A first stand 32 supports the strainer 18 and a second stand 34 supports the filter 21.

The filtering suite 11 includes the strainer 18, a filter 21 connected to the strainer 18 by a hose 20, and an encased chemically selective polymer 26 connected to the filter 21 by another hose 20. The strainer 18 receives a waste water flow from the FDC 13 through the sight tube and strains the waste water flow to create a strained flow. The filter 21 receives the strained flow from the strainer 18 and filters the strained flow to create a filtered flow. The encased chemically selective polymer 26 receives the filtered flow from the filter 21 and cleans the filtered flow to create a clean flow 30 from a drain hose 27, suitable for draining into a storm drain or into landscaping.

Figure 2:
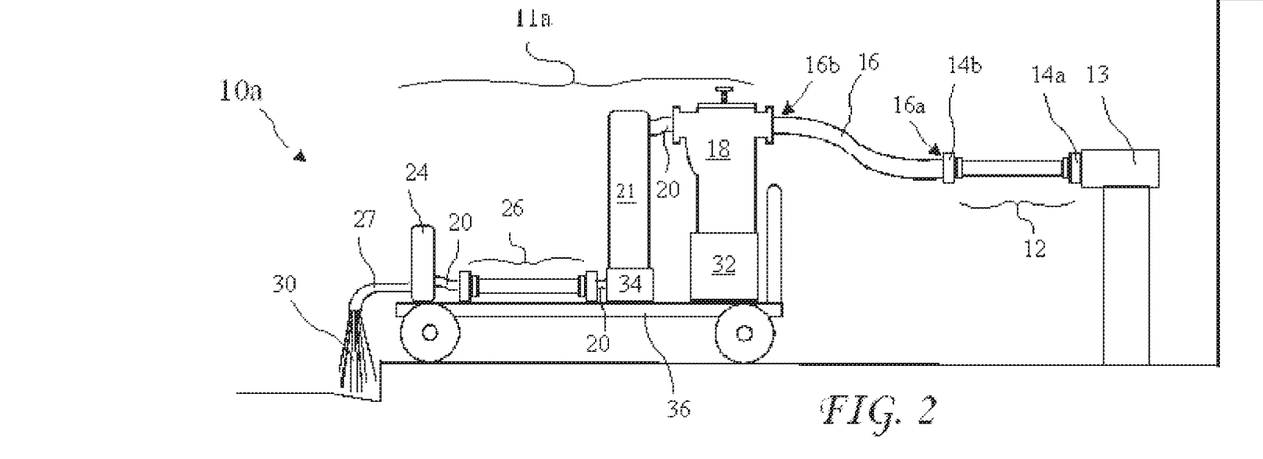
FIG. 2 depicts a second embodiment of a waste water filtering system according to the present invention connected to the Fire Department Connection (FDC).

A second embodiment of a waste water filtering system 10a according to the present invention is shown connected to the FDC 13 in FIG. 2. The waste water filtering system 10a includes a second filter suite 11a with a Reverse Osmosis (RO) filter 24 connected serially between the encased chemically selective polymer 26 and the drain hose 27 to remove nitrates from the clean flow 30 The waste water filtering system 10a is otherwise similar to the waste water filtering system 10. Suitable RO filters are available from Toray Membrane Inc, a supplier out of Poway, Calif.

Figure 3:
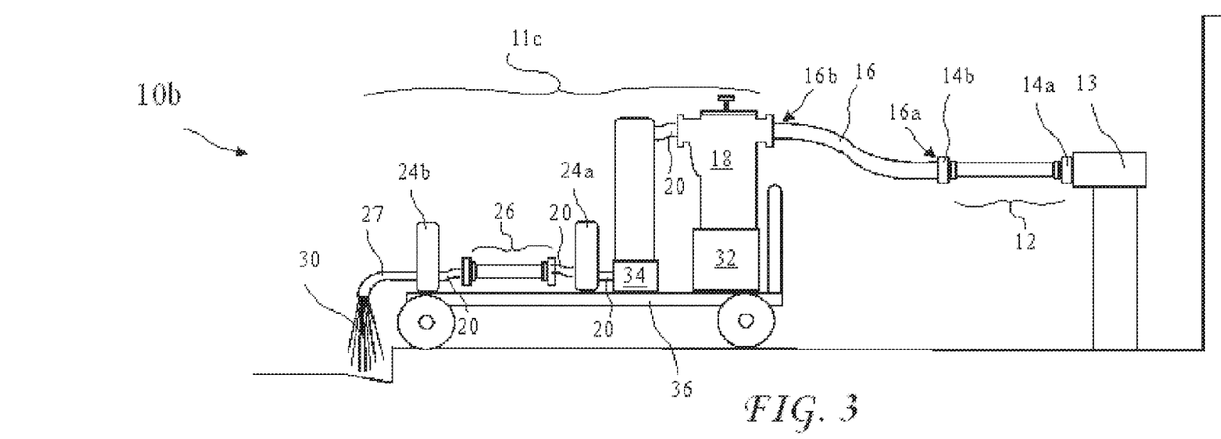
FIG. 3 depicts a third embodiment of a waste water filtering system according to the present invention connected to the Fire Department Connection (FDC).

A third embodiment of a waste water filtering system 10b according to the present invention is shown connected to the FDC 13 in FIG. 3. The waste water filtering system 10b includes a third filter suite 11b having a first RO filter 24a connected serially between the filter 21 and the encased chemically selective polymer connected 26, and with a second RO filter 24b connected serially between the encased chemically selective polymer 26 and the drain hose 28, both to remove nitrates from the filtered flow and from the clean flow 30 The waste water filtering system 10b is otherwise similar to the waste water filtering system 10.

Figure 4:
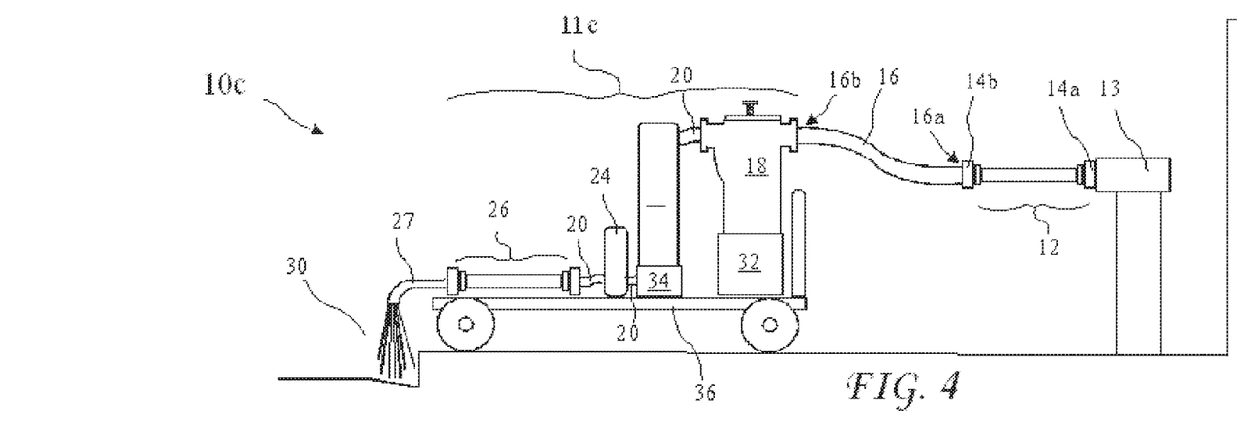
FIG. 4 depicts a fourth embodiment of a waste water filtering system according to the present invention connected to the Fire Department Connection (FDC).

A fourth embodiment of a waste water filtering system 10c according to the present invention is shown connected to the FDC 13 in FIG. 4. The waste water filtering system 10c includes a fourth filter suite 11c with an RO filter 24 connected serially between the filter 21 and the encased chemically selective polymer 26 to remove nitrates from the clean flow 30 The waste water filtering system 10c is otherwise similar to the waste water filtering system 10.

Figure 5:
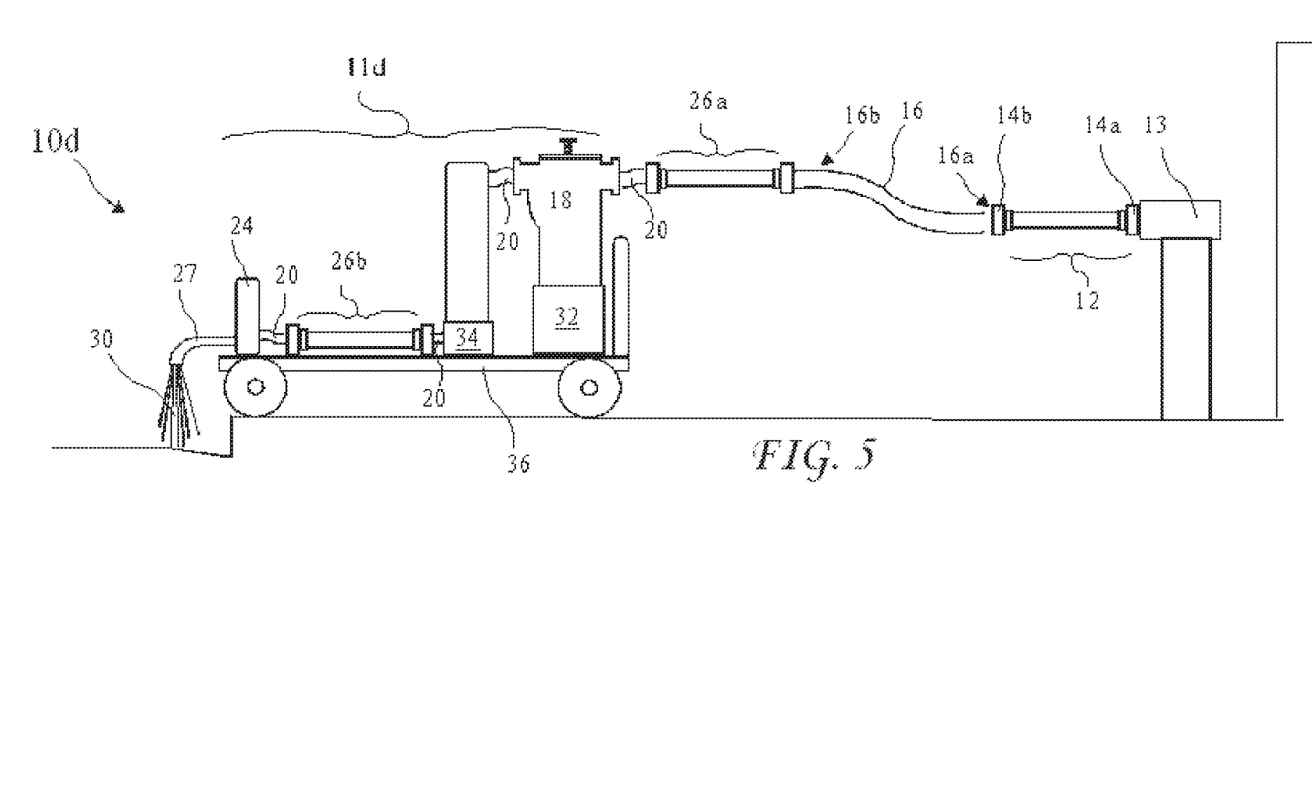
FIG. 5 depicts a fifth embodiment of a waste water filtering system according to the present invention connected to the Fire Department Connection (FDC).

A fifth embodiment of a waste water filtering system 10d according to the present invention is shown connected to the FDC 13 in FIG. 5. The waste water filtering system 10d includes a fifth filter suite 11d with a first encased chemically selective polymer 26a connected serially between the sight tube 12 and the strainer 18, and an RO filter 24 connected serially between a second encased chemically selective polymer 26b and the drain hose 30. The waste water filtering system 10d is otherwise similar to the waste water filtering system 10.

Figure 6A:
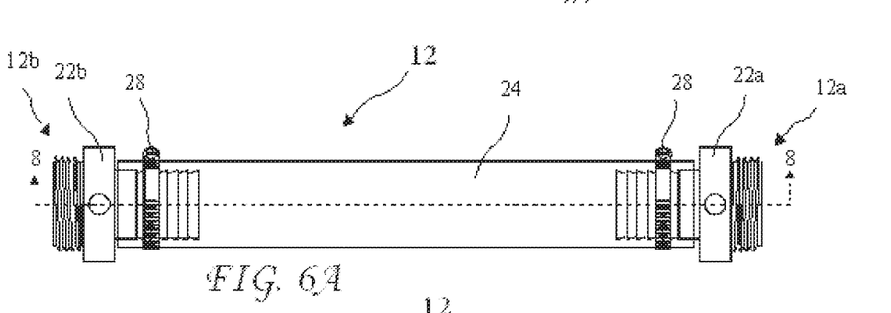
FIG. 6A is a side view of a sight tube according to the present invention.
Figure 6B:
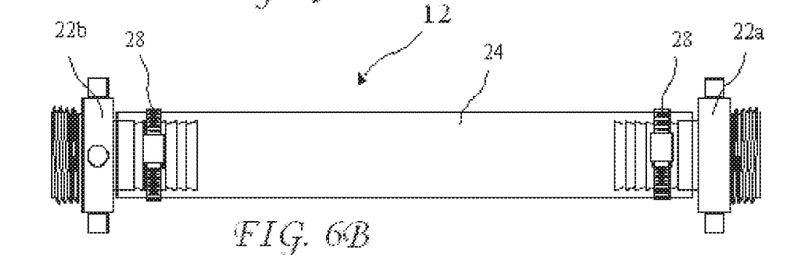
FIG. 6B is a top view of the sight tube.
Figure 6C:
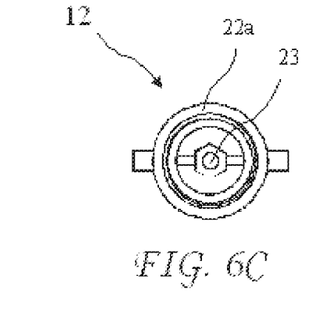
FIG. 6C is an end view of the sight tube.

A side view of the sight tube 12 according to the present invention is shown in FIG. 6A, a top view of the sight tube 12 is shown in FIG. 6B, and an end view of the sight tube 12 is shown in FIG. 6C. The sight tube 12 is preferably a clear sight tube, or at least sufficiently clear to view a flow of waste water through the sight tube 12 well enough to determine when the flow has become clean or sufficiently clean to end a test. The sight tube 12 is preferably between approximately eight inches and approximately 24 inches long and more preferably approximately twelve inches long, and preferably has an inside diameter between approximately 2¼ inches and approximately 2¾ inches and more preferably has an inside diameter of approximately 2½ inches. Barbed male fittings 22a and 22b are attached to opposite ends of a length of tubing 24 to form the sight tube 12. An example of a suitable material for the tubing 24 is Poly Ethylene-Terephthalate Glycol (PETG) clear tubing made by Visipak in Arnold, Mo. The first fitting 22a connects to the first female swivel fitting 14a on the FDC 13 (see FIG. 1), and the second fitting 22b connects to the second swivel fitting 14b on the hose 16. Clamps 28 are tightened around the outside of the tubing 24 to cause the tubing 24 to grasp the fittings 22a and 22b. The clamps 28 are preferably hose clamps.

A second sight tube end 12b resides opposite the first sight tube end 12a and is generally connected to the hose 16. The first fitting 22a preferably includes an all thread rod fitting 23 bridging the interior of the first fitting 22a. The rod fitting 23 is configured to attach a rod 26 (see FIGS. 8A and 8B) which then extends from a FDC end 12a of the sight tube 12. When the sight tube 12 is connected to the FDC 13, the rod 26 reached inside the FDC 13 and holds a clapper valve open to allow the waste water to flow from the FDC 13 into the sight tube 12.

Figure 7A:
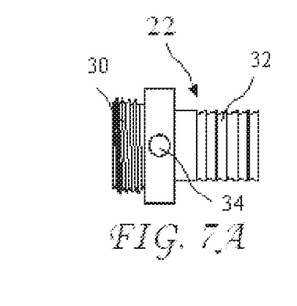
FIG. 7A is a side view of a barbed fitting of the sight tube.
Figures 7B, 8, 9A, 9B:
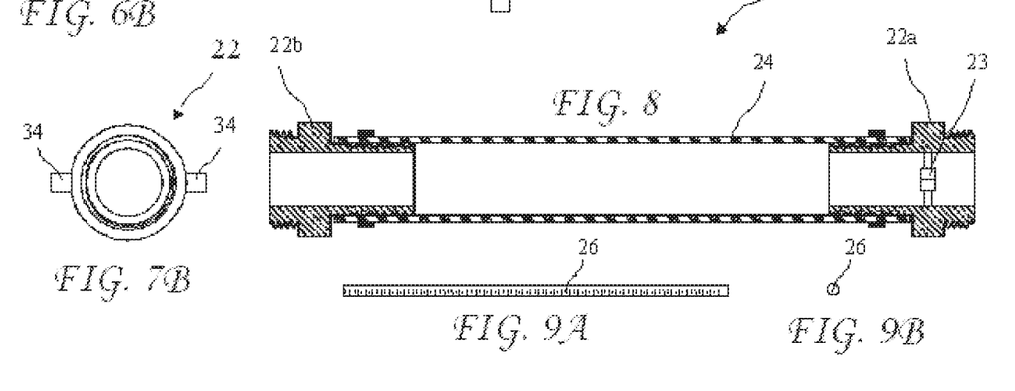
FIG. 7B is an end view of the barbed fitting of the sight tube.
FIG. 8 is a cross-sectional view of the sight tube taken along line 8-8 of FIG. 6A.
FIG. 9A is a side view of an all thread rod used to hold a clapper valve open.
FIG. 9B is an end view of the all thread rod used to hold the clapper valve open.

A side view of the barbed fitting 22a or 22b of the sight tube 12 is shown in FIG. 7A and an end view of the barbed fitting 22a or 22b is shown in FIG. 7B. The barbed fittings 22a or 22b include male threads 30, barbed portions 32, and tightening features 34. The threads 30 are preferably sized to connect to the female swivel fittings 14a and 14b and are more preferably threaded with a National Pipe Thread (NPT). The barbed portions 32 are approximately 3½ inches long. The features 34 are provided to aid in turning, or preventing turning of, the sight tube 12 when the sight tube 12 is connected to the FDC 13 or the hose 16. The features are preferably round cylindrical projections from opposite sides of the fittings 22a and 22b. An example of a suitable fitting 22a or 22b is a 2½ inch fitting available from the J. C. Gadd Company in Denver, Colo.

A cross-sectional view of the sight tube 12 taken along line 8-8 of FIG. 6A. is shown in FIG. 8. The rod fitting 23 is seen residing in the barbed fitting 22a.

A side view of the rod 26 according to the present invention is shown in FIG. 9A and an end view of the rod 26 is shown in FIG. 9B. The rod 26 is approximately twelve inches long and approximately ¼ inches in diameter (Is this OK?). A threaded fitting may attached to the end of the rod 26 to allow extensions to be screwed onto the rod 26 for applications requiring a longer rod length $L_r$ (for example, sixteen inches) for holding a one-way-valve open.

Figure 10:
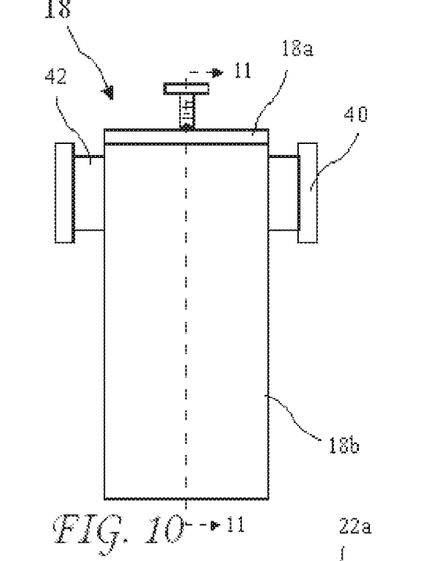
FIG. 10 is a side view of a strainer of a filtering suite according to the present invention.
Figure 11:
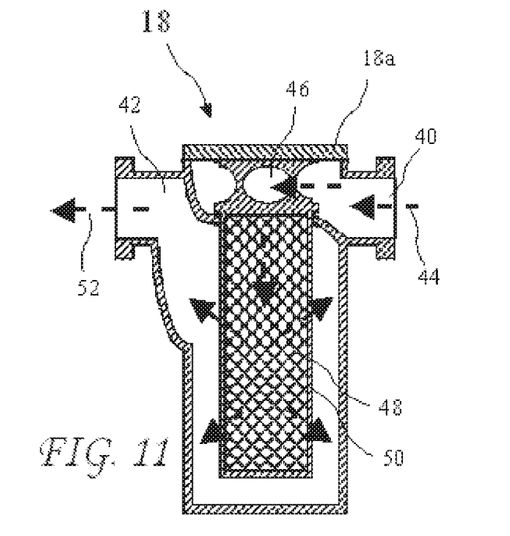
FIG. 11 is a cross-sectional view of the strainer taken along line 11-11 of FIG. 10.

A side view of the strainer 18 of the filtering suite 11 is shown in FIG. 10, and a cross-sectional view of the strainer taken along line 11-11 of FIG. 10 is shown in FIG. 11. The strainer 18 includes a removable, cleanable, and replaceable basket 48. The waste water flow 44 enters the strainer 18, passed into the basket 48 through ports 46, and is strained as it flows through the basket walls 50. The basket walls 50 preferably include orifices to capture particles greater than between approximately 50 microns and approximately 100 microns in size, and more preferably include orifices to capture particles greater than approximately 100 microns in size. A strained flow 53 is created by the strainer 18. An example of a suitable strainer is an Eaton Model 72 made by Eaton in Eden Prairie, Minn.

Figure 12:
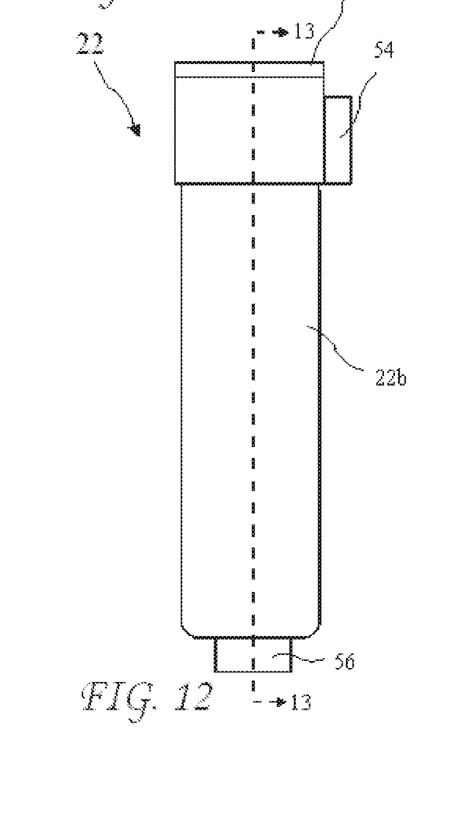
FIG. 12 is a side view of a filter of a filtering suite according to the present invention.
Figure 13:
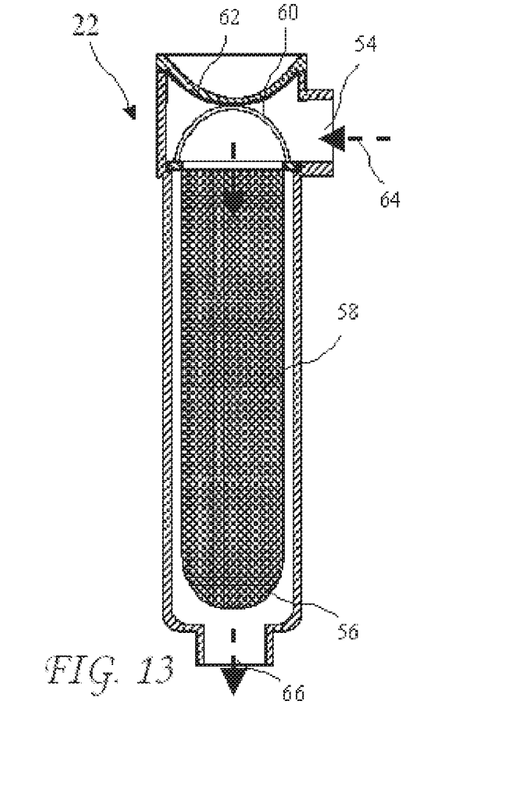
FIG. 13 is a cross-sectional view of the filter taken along line 13-13 of FIG. 12.
Figure 14:
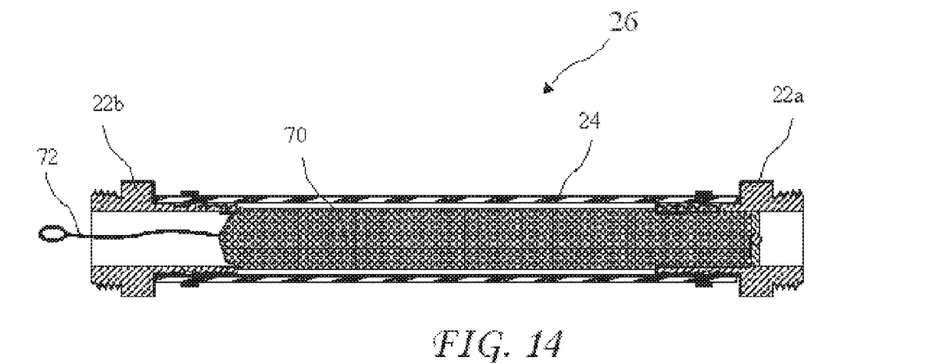
FIG. 14 is a cross-sectional view of a second sight tube encasing a chemically selective polymer.

A side view of the filter element 22 of a filtering suite 11 is shown in FIG. 12, and a cross-sectional view of the filter 21 taken along line 13-13 of FIG. 12 is shown in FIG. 12. The filter 18 includes a filter bag 58 having a surface material 56 preferably selected to capture material greater than between approximately 0.5 micron and two microns in size, and more preferably selected to capture material greater than approximately one micron in size. A filtered flow 66 is created by the filter 21. An example of a suitable filter is a Flowline filter made by Eaton in Eden Prairie, Minn.

A cross-sectional view of a second sight tube 26 encasing a chemically selective polymer is shown in FIG. 13. The sight tube 26 is similar to the sight tube 12, but encases the chemically selective polymer preferably selected to remove oil from the filtered flow.

Figure 15:
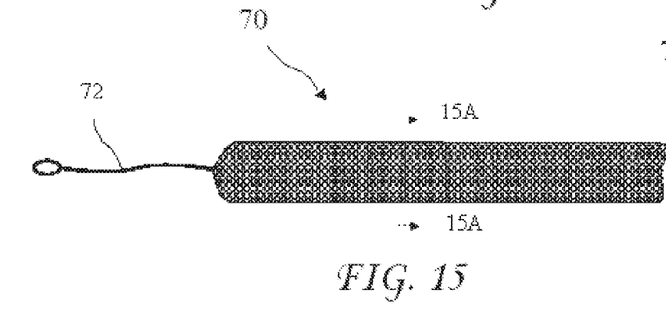
FIG. 15 is a side view of a media bag filter containing the chemically selective polymer.
Figure 15A:
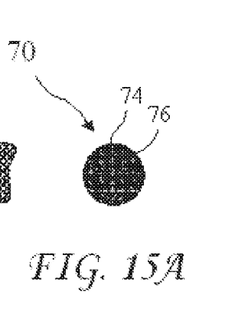
FIG. 15A is cross-sectional view of the media bag of the media bag filter containing the chemically selective polymer taken along line 15A-15A of FIG. 15.

A side view of a media bag filter 70 is shown in FIG. 15 and a cross-sectional view of the media bag filter 70 taken along line 15A-15A of FIG. 15 is shown in FIG. 15A. The media bag filter 70 comprises a bag 74 containing the chemically selective polymer 76. The bag 74 is preferably an open woven mesh fabric polyester. Initially, the bag 74 is filled approximately 50 percent by volume with the chemically selective polymer 76. The chemically selective polymer 76 expands as it become saturated with water, and eventually fills the interior of the second site tube 26. The media bag filter 70 includes a pull 72 for extracting the media bag filter 70 from the sight tube 26. A suitable material for the bag 74 is product No. 07/950/58 made by Sefar in Monterey Park, Calif. A suitable chemically selective polymer is a Smart Sponge® material or a Smart Sponge® Plus ACX10N/55-Plus4 material made by AbTech in Scottsdale, Ariz.

Figure 16A:
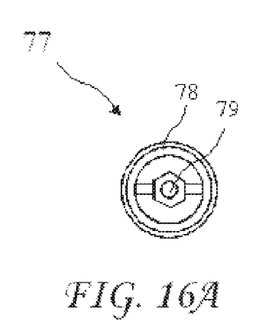
FIG. 16A is a front view of an all thread rod adapter for positioning the all thread rod in the FDC to hold the clapper valve open.
Figure 16B:
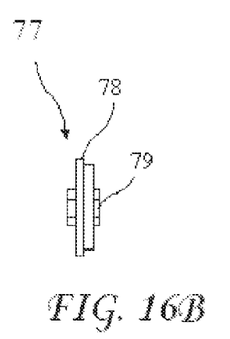
FIG. 16B is a side view of the all thread rod adapter for all thread positioning the rod in the FDC to hold the clapper valve open.

A front view of a rod adapter 77 for positioning the rod 26 (see FIGS. 8A and 8B) in the FDC 13 to hold the clapper valve open is shown in FIG. 16A and a side view of the rod adapter 77 is shown in FIG. 16B. The rod adapter 77 may be positioned between any sight tube, hose, etc. connected to the FDC 13, and is held in place between the fittings. When space is not present to connect the sight tube 12 directly to the FDC 13, the rod adapter 77 may be used with a short hose to connect the sight tube 12 to the FDC 13 through the short hose.

Figure 17:
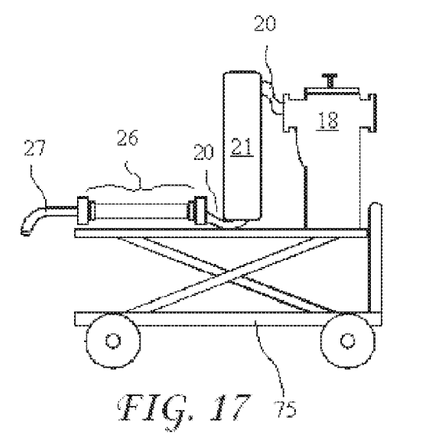
FIG. 17 is the waste water filtering system mounted to a vertically expanding cart.

The filter suite 11 is shown residing on a vertically expanding cart 75 in FIG. 17. The vertically expanding cart 75 allows the filter suite 11 to be carried in a small vehicle when the cart 75 is vertically retracted. An example of a suitable cart 75 is a Model 288 Salesmaker Cart made by Ferno-Washington, INC. In Wilmington, Ohio.

Figure 18:
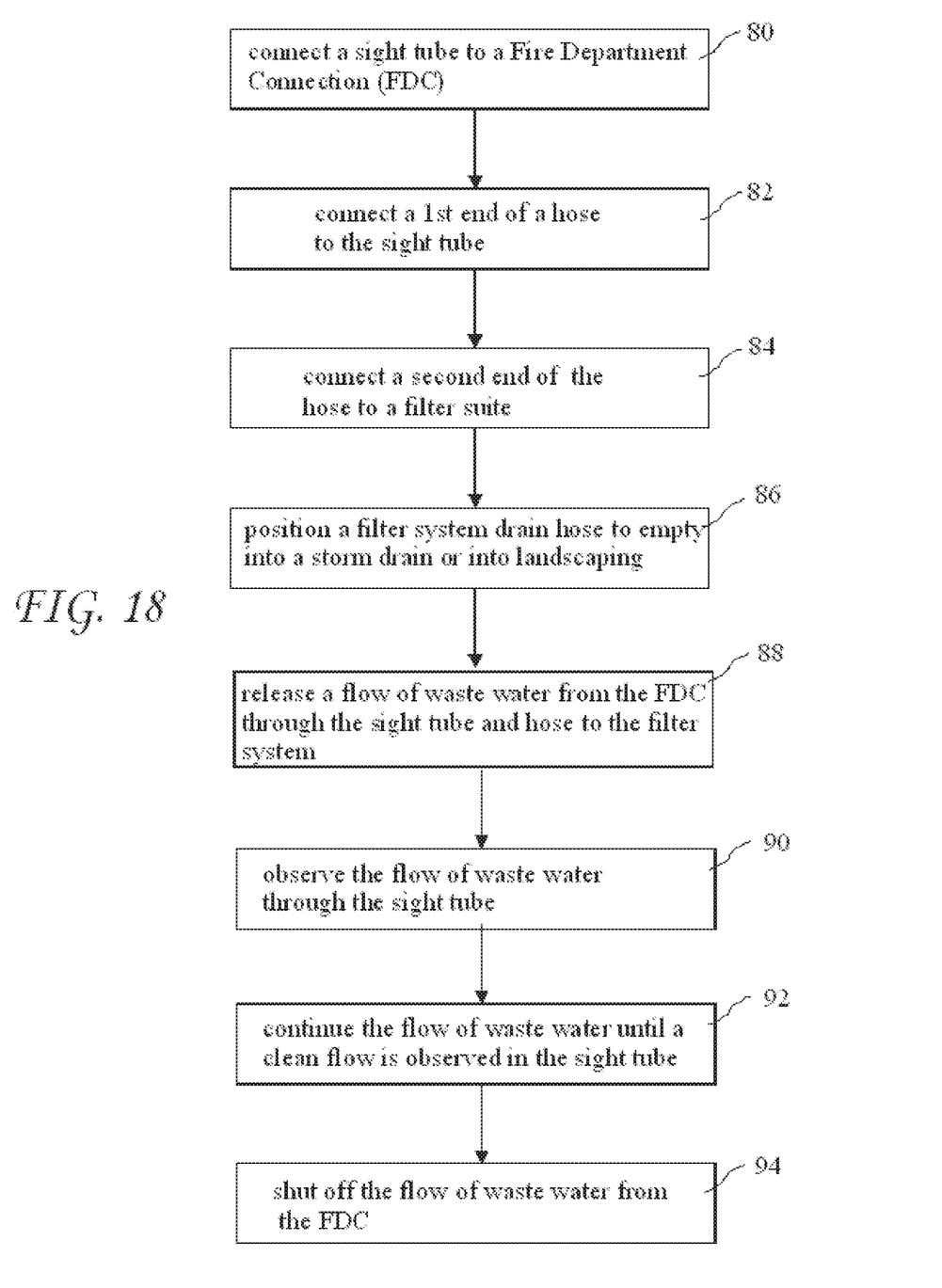
FIG. 18 is a method according to the present invention for filtering waste water released from the FDC.

A method according to the present invention for containing and transporting waste water is described in FIG. 18. The method includes: connecting a sight tube to a Fire Department Connection (FDC) at step 80; connecting a first end of a hose to the sight tube at step 82; connecting a second end of the hose to a filter suite, the filter system sequentially comprising a strainer, a filter, and an encased chemically selective polymer at step 84; positioning a filter system drain hose to empty into a storm drain and/or landscaping at step 86; releasing a flow of waste water from the FDC through the sight tube and hose to the filter system at step 88; observing the flow of waste water through the sight tube at step 90; continuing the flow of waste water until a clean flow is observed in the sight tube at step 92; and shutting off the flow of waste water from the FDC when a clean flow is observed at step 94. The filter suite may further include an RO filter before or after the encased chemically selective polymer, or both before and after the encased chemically selective polymer.

While the invention herein disclosed has been described by means of specific embodiments and applications thereof, numerous modifications and variations could be made thereto by those skilled in the art without departing from the scope of the invention set forth in the claims.

I claim:

1. A method for filtering waste water, the method comprising:
   connecting a sight tube to a Fire Department Connection (FDC);
   connecting a first end of a hose to the sight tube;
   connecting a second end of the hose to a filter system, the filter system sequentially comprising a strainer, a filter, and an encased chemically selective polymer;
   positioning a filter system drain hose to empty into at least one of a storm drain and landscaping;
   releasing a flow of waste water from the FDC through the sight tube and hose to the filter system;
   observing the flow of waste water through the sight tube;
   continuing the flow of waste water until a clean flow is observed in the sight tube; and
   shutting off the flow of waste water from the FDC.

2. A waste water filtering system comprising:
   a sight tube for observing the clarity of a waste water flow;

a filtering suite connected to the sight tube for receiving the waste water flow from the sight tube, the filtering suite sequentially comprising:
  first, a strainer for capturing large particles in the waste water flow to create a strained flow;
  second, a filter for capturing small particles remaining in the strained flow to create a filtered flow; and
  third, an encased chemically selective polymer for capturing oils in the filtered flow to create a clean flow; and
a drain hose connected to an outlet of the encased chemically selective polymer for carrying the clean flow to a drain site.

3. The waste water containment system of claim 2, further including a Reverse Osmosis (RO) filter residing serially between the encased chemically selective polymer and the drain hose for removing nitrates from the clean flow.

4. The waste water containment system of claim 3, wherein the encased chemically selective polymer is a second encased chemically selective polymer, and further including a first encased chemically selective polymer residing serially between the sight tube and the strainer.

5. The waste water containment system of claim 3, further including a second RO filter residing serially between the filter and the encased chemically selective polymer for removing nitrates from the filtered flow.

6. The waste water containment system of claim 2, further including a Reverse Osmosis (RO) filter residing serially between the filter and the encased chemically selective polymer for removing nitrates from the filtered flow.

7. The waste water filtering system of claim 2, wherein the strainer includes a strainer element for capturing particles greater than between approximately 50 microns and approximately 100 microns.

8. The waste water filtering system of claim 7, wherein the strainer element comprises removable, cleanable, and replaceable basket for capturing particles greater than between approximately 50 microns and approximately 100 microns in size.

9. The waste water filtering system of claim 7, wherein the filter includes a filter element for capturing particles greater than between approximately 0.5 microns and approximately two microns in size.

10. The waste water filtering system of claim 2, wherein the encased chemically selective polymer comprises an encased chemically selective polymer including an antimicrobial agent for destroying bacteria in the filtered flow.

11. The waste water filtering system of claim 2, wherein the encased chemically selective polymer comprises a chemically selective polymer encased in a second sight tube.

12. The waste water filtering system of claim 2, wherein the waste water source is a Fire Department Connection (FDC).

13. The waste water filtering system of claim 12, wherein the sight tube includes a fitting for removably attaching a rod for entering the FDC to hold a clapper valve open to allow the waste waster to flow from the FDC.

14. A waste water filtering system comprising:
  a sight tube for observing the clarity of a waste water flow;
  a filtering suite connected to the sight tube for receiving the waste water flow from the sight tube, the filtering suite sequentially comprising:
    first, a strainer for capturing large particles greater than between approximately 50 microns and approximately 100 microns in size in the waste water flow to create a strained flow;
    second, a filter for capturing small particles greater than between approximately 0.5 microns and approximately two microns in size remaining in the strained flow to create a filtered flow; and
    third, a second sight tube encasing a chemically selective polymer for capturing oils in the filtered flow to create a clean flow; and
  a drain hose connected to an outlet of the encased chemically selective polymer for carrying the clean flow to a drain site.

* * * * *